United States Patent
Liu et al.

(10) Patent No.: US 9,105,935 B2
(45) Date of Patent: Aug. 11, 2015

(54) METHOD FOR MAKING FUEL CELL MEMBRANE ELECTRODE ASSEMBLY

(75) Inventors: Zhi-Xiang Liu, Beijing (CN); Cheng Wang, Beijing (CN); Zong-Qiang Mao, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 660 days.

(21) Appl. No.: 13/340,617

(22) Filed: Dec. 29, 2011

(65) Prior Publication Data

US 2013/0032269 A1 Feb. 7, 2013

(30) Foreign Application Priority Data

Aug. 5, 2011 (CN) .......................... 2011 1 0223762

(51) Int. Cl.
*H01M 4/88* (2006.01)
*H01M 4/92* (2006.01)
*H01M 8/10* (2006.01)

(52) U.S. Cl.
CPC ............ *H01M 4/8803* (2013.01); *H01M 4/885* (2013.01); *H01M 4/8814* (2013.01); *H01M 4/8817* (2013.01); *H01M 4/8896* (2013.01); *H01M 4/925* (2013.01); *H01M 4/926* (2013.01); *H01M 8/1004* (2013.01); *H01M 4/92* (2013.01); *Y02E 60/521* (2013.01)

(58) Field of Classification Search
None
See application file for complete search history.

(56) References Cited

U.S. PATENT DOCUMENTS

| | | | |
|---|---|---|---|
| 7,790,331 B1 | 9/2010 | Champion et al. | |
| 2002/0177525 A1* | 11/2002 | Xing et al. | 502/230 |
| 2004/0167014 A1* | 8/2004 | Yan et al. | 502/101 |
| 2010/0004121 A1* | 1/2010 | Chang et al. | 502/185 |
| 2010/0021774 A1 | 1/2010 | Zhang et al. | |
| 2010/0111813 A1* | 5/2010 | Fan | 423/447.1 |
| 2010/0151278 A1 | 6/2010 | Zhang et al. | |
| 2010/0151297 A1 | 6/2010 | Zhang et al. | |
| 2010/0298125 A1 | 11/2010 | Kim et al. | |
| 2011/0171541 A1 | 7/2011 | Nakagawa et al. | |
| 2011/0189564 A1* | 8/2011 | Eldridge et al. | 429/423 |

FOREIGN PATENT DOCUMENTS

| | | |
|---|---|---|
| JP | 2005-4967 | 1/2005 |
| JP | 2005-203332 | 7/2005 |

(Continued)

OTHER PUBLICATIONS

Recent advances in fuel cell technology and its applications, G.J.K. Acres, Journal of Power Sources, 100(2001), pp. 60-66.

*Primary Examiner* — Jonathan Crepeau
(74) *Attorney, Agent, or Firm* — Novak Druce Connolly Bove + Quigg LLP

(57) ABSTRACT

A method for making fuel cell membrane electrode assembly is provided. In the method, a porous template having a number of holes and a proton exchange membrane is provided. A number of tube carriers having electron conductibility are formed. Each tube carrier is formed in one hole of the porous template. A number of catalyst particles are uniformly adsorbed on inner walls of the tube carriers. Proton conductor is filled in the tube carriers having catalyst particles adsorbing thereon. The proton exchange membrane is sandwiched between the two porous templates to form a laminated structure. The laminated structure is hot pressed. The porous templates are removed from the hot pressed laminated structure.

20 Claims, 4 Drawing Sheets

(56) References Cited

FOREIGN PATENT DOCUMENTS

| JP | 2006-140103 | 6/2006 |
| JP | 2007-188810 | 7/2007 |
| JP | 2009-515302 | 4/2009 |
| JP | 2010-269302 | 12/2010 |
| JP | 2011-165464 | 8/2011 |
| TW | 201008010 | 2/2010 |
| TW | 201029251 | 8/2010 |
| TW | 201029254 | 8/2010 |
| WO | WO2009/025158 | 2/2009 |

\* cited by examiner

METHOD FOR MAKING FUEL CELL MEMBRANE ELECTRODE ASSEMBLY

CROSS-REFERENCE TO RELATED APPLICATIONS

This application claims all benefits accruing under 35 U.S.C. §119 from China Patent Application No. 201110223762.4, filed on Aug. 5, 2011, in the China Intellectual Property Office, the contents of which are hereby incorporated by reference.

BACKGROUND

1. Technical Field

The present disclosure relates to a method for making a fuel cell membrane electrode assembly.

2. Description of Related Art

A fuel cell is a power generating device which can convert chemical energy into electrical energy through an electrochemical reaction. The fuel cells are usually classified as alkaline fuel cells, solid oxide fuel cells, and proton exchange membrane fuel cells. Recently, the proton exchange membrane fuel cells are rapidly developed and have attracted great interests.

A membrane electrode assembly is an important component of the proton exchange membrane fuel cell and includes a proton exchange membrane and two electrodes. The proton exchange membrane is sandwiched between the two electrodes. The electrode commonly includes a catalyst layer and a gas diffusion layer. The catalyst layer is sandwiched between the gas diffusion layer and the proton exchange membrane. The catalyst layer commonly includes a catalyst, a catalyst carrier, a proton conductor, and adhesive. In general, the catalyst carrier is carbon particles, and the catalyst is nano-scale precious metal particles uniformly dispersed in the catalyst carrier. A catalytic efficiency of the catalyst layer can influence the property of the fuel cell. The catalytic efficiency can be increased by increasing the three-phase reaction interfaces between the precious metal particles and reaction gas, and protons and electrons. Specifically, the reaction gas such as hydrogen can reach the surfaces of the precious metal particles through gas passages and generate protons and electrons from a catalytic reaction. The protons can move toward the proton exchange membrane through proton passages defined by a network composed of the proton conductor. The electrons can transfer toward the gas diffusion layer through a conductive network composed of the catalyst carrier. If the transfer passages are obstructed, the electrochemical reaction of the fuel cell will be frustrated.

The catalyst layer is commonly formed on the surfaces of the gas diffusion layer and the proton exchange membrane by brush coating, spraying, or printing. The catalyst layer has a disordered stack structure composed of a plurality of aggregates. It is difficult to catalyze the electrochemical reaction because the precious metal particles are embedded in the aggregates. Thus, the utilization rate of the catalyst in the catalyst layer having the disordered stack structure is low.

What is needed, therefore, is to provide a method for making a fuel cell membrane electrode assembly having a high catalyst utilization rate.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
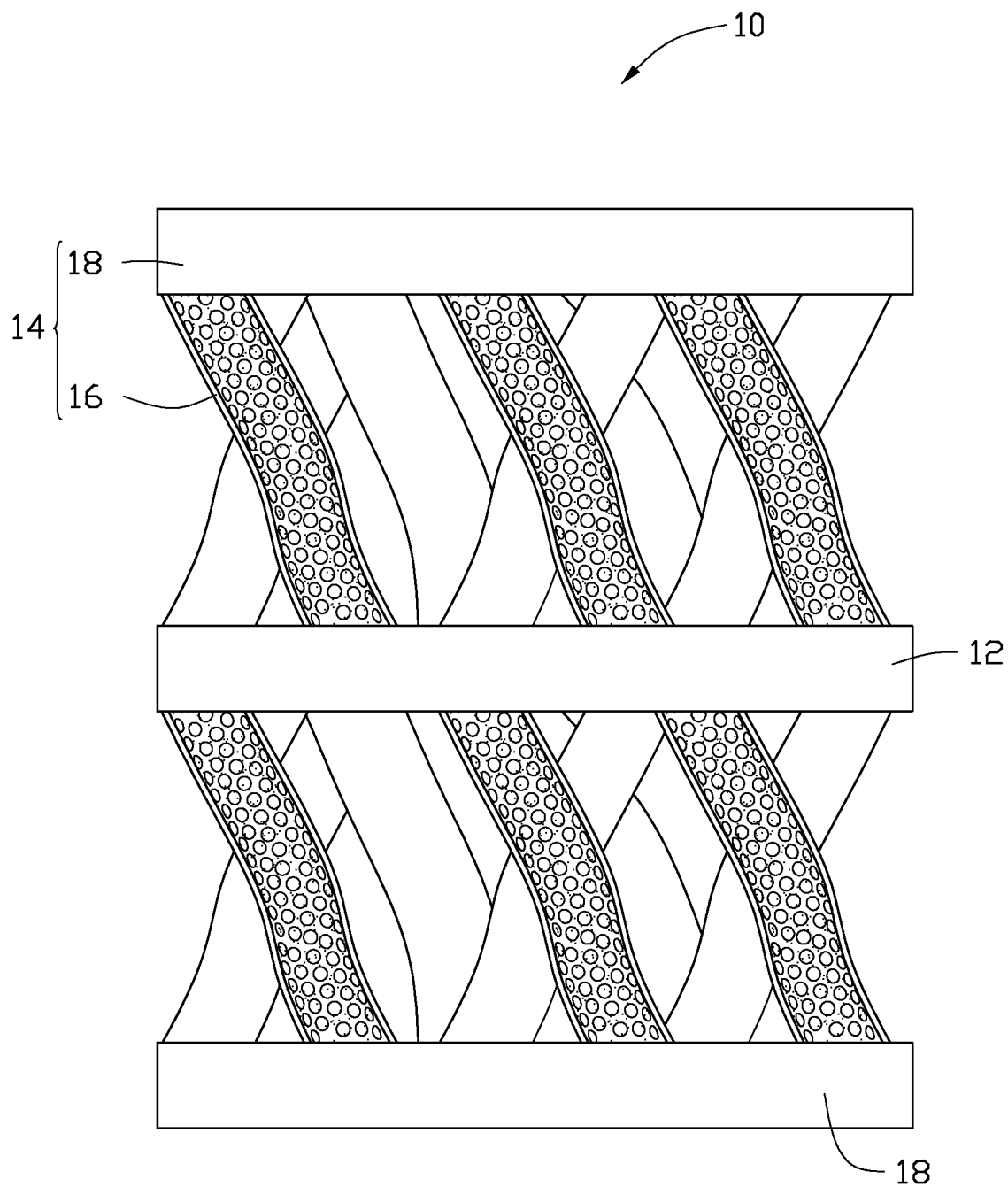
FIG. 1 is a structural view of one embodiment of a fuel cell membrane electrode assembly having a network structure composed of a plurality of tube carriers intersected with each other.
Figure 2:
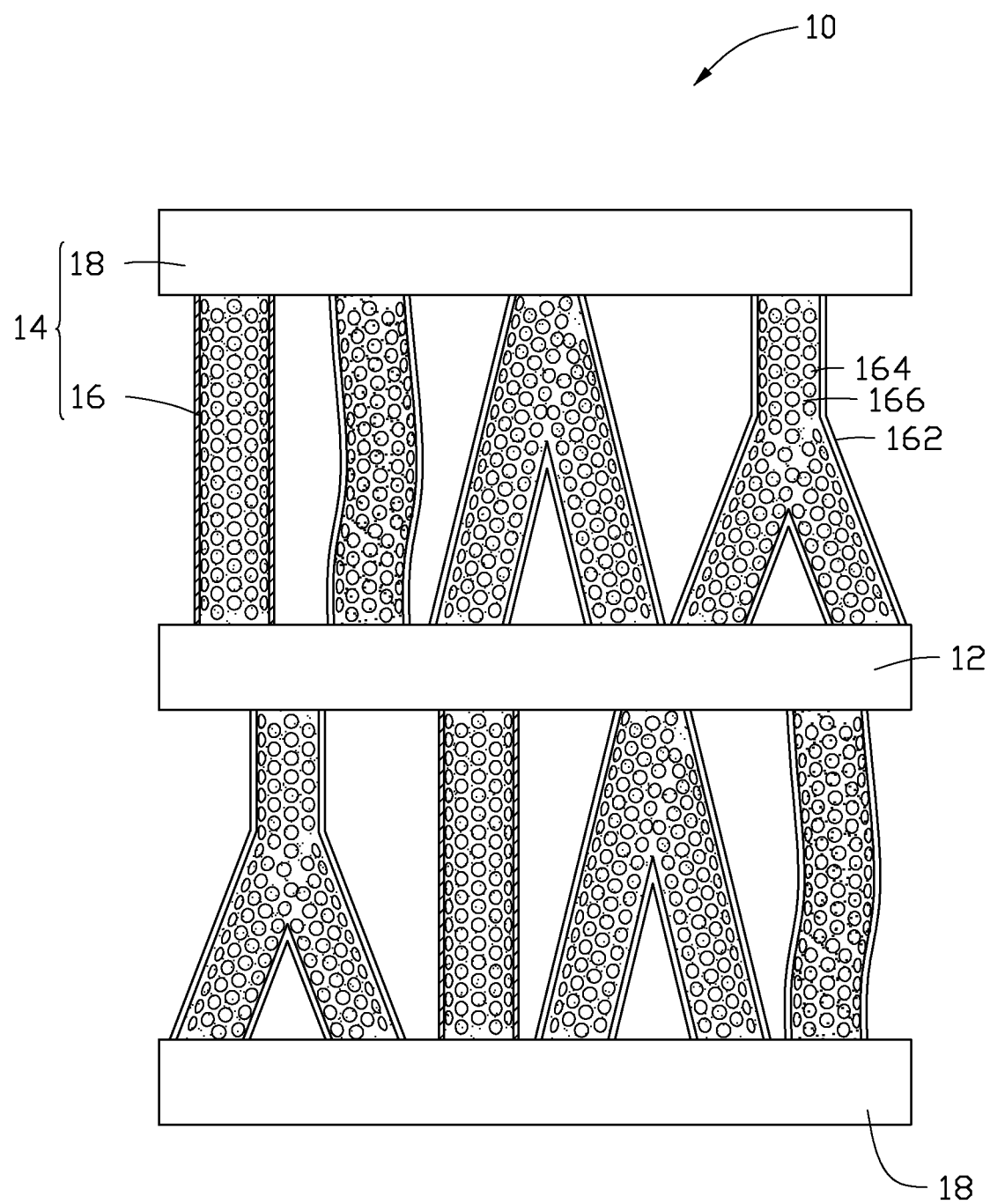
FIG. 2 is a structural view of another embodiment of a fuel cell membrane electrode assembly including a plurality of tube carriers having different shapes.
Figure 3:
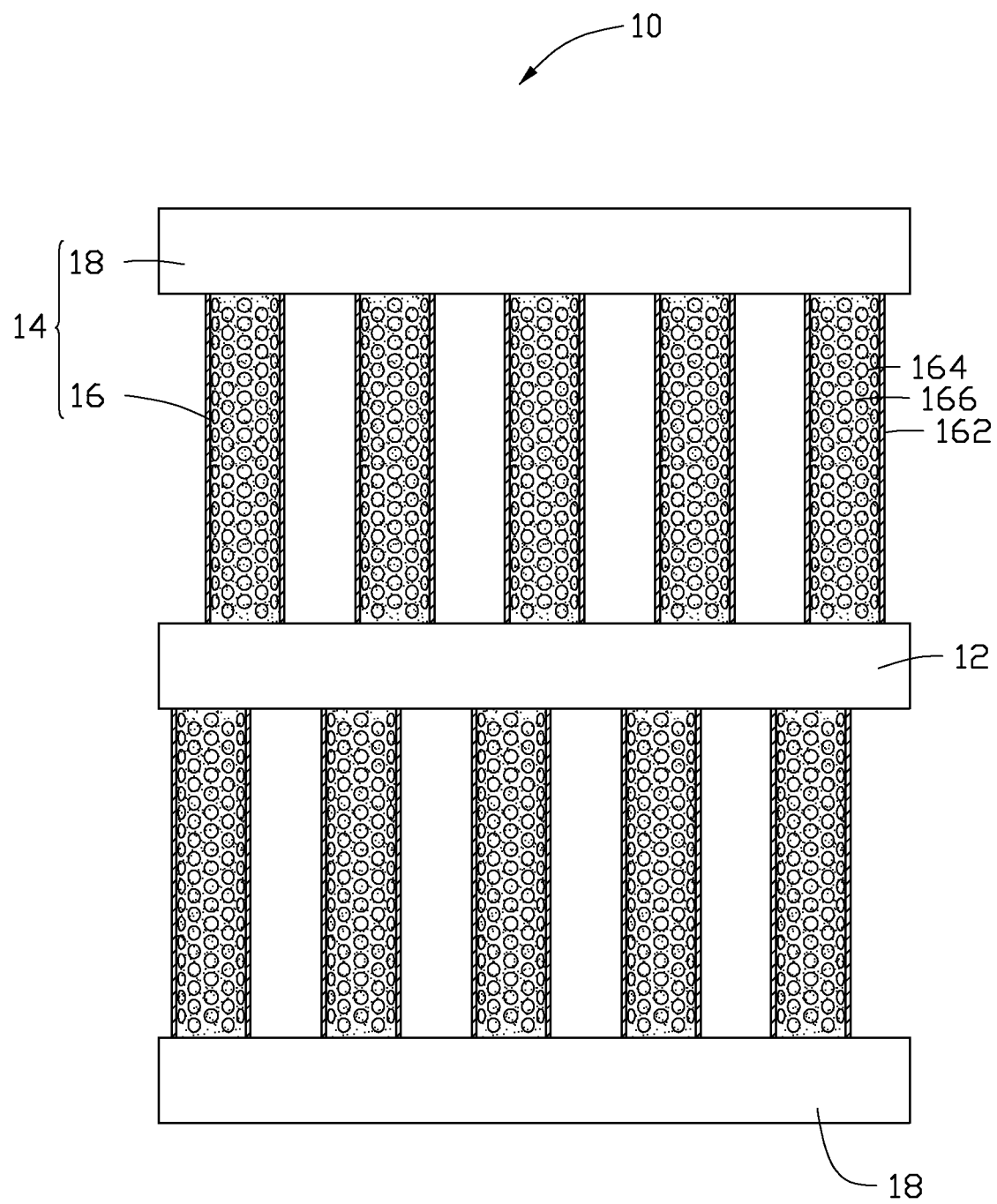
FIG. 3 is a structural view of yet another embodiment of a fuel cell membrane electrode assembly including a plurality of tube carriers parallel to each other and spaced from each other.

Referring to FIGS. 1 to 3, one embodiment of a fuel cell membrane electrode assembly (FCMEA) 10 includes a proton exchange membrane 12 and two electrodes 14. The proton exchange membrane 12 is sandwiched between two electrodes 14. Each electrode 14 includes a catalyst layer 16 and can include a gas diffusion layer 18. The catalyst layer 16 is in contact with a surface of the proton exchange membrane 12. The catalyst layer 16 includes a plurality of tube carriers 162, a plurality of catalyst particles 164, and a proton conductor 166. The plurality of catalyst particles 164 are uniformly adsorbed on inner walls of the tube carriers 162. The proton conductor 166 is filled in the plurality of tube carriers 162. The plurality of tube carriers 162 cooperatively define a plurality of reaction gas passages. The reaction gas can directly diffuse to the surfaces of the catalyst particles 164 through the reaction gas passages. The tube carriers 162 can be porous tube structures having electron conductibility. One end of each of the tube carriers 162 is connected with the proton exchange membrane 12, by which the proton conductor 166 filled in the tube carriers 162 can be in contact with the proton exchange membrane 12. In the FCMEA 10, one electrode 14 is used as cathode, and the other electrode 14 is used as an anode.

The proton exchange membrane 12 can define passages to transfer protons between the two electrodes 14. The proton exchange membrane 12 is disposed between the two electrodes 14, such that the two electrodes 14 cannot be in contact with each other. A material of the proton exchange membrane 12 can be a proton exchange resin containing sulfoacid group. The proton exchange resin can be perfluorosulfonic acid resin or sulfonate polymer having a proton exchange function and excellent thermal stability. The sulfonate polymer can be sulfonated polyether sulphone resin, sulfonated polyphenylene sulfide resin, sulfonated polybenzimidazole resin, sulfonated phosphorus enrichment nitriles resin, sulfonated polyimide resin, sulfonated polystyrene-polyethylene copolymer resin, or any combination thereof. A thickness of the proton exchange membrane 12 can be in a range from about 10 microns (μm) to 200 μm (e.g. 18 μm to 50 μm). In one embodiment, the proton exchange membrane 12 is perfluorosulfonic acid resin having a thickness of about 25 μm.

The plurality of tube carriers 162 in the catalyst layer 16 can be orderly or disorderly arranged. The plurality of reaction gas passages defined by the tube carriers 162 is a plurality of gaps defined between the tube carriers 162 and a plurality of holes defined by the tube wall of the tube carriers 162. The reaction gas can reach the tube walls of the tube carriers through the gaps. Furthermore, the reaction gas can diffuse into the tube carriers 162 to contact the catalyst particles 164 adsorbed on the inner walls of the tube carriers 162 through the holes on the tube walls. The tube carriers 162 can be spaced from each other to define the plurality of reaction gas passages between the tube carriers 162, or the tube carriers 162 can intersected each other to form a network having a plurality of holes. A shape of each of the tube carriers 162 from between the gas diffusion layer 18 and the proton exchange membrane 12 is not limited and can be straight, curvy, "V" shaped, or "Y" shaped. Referring to FIG. 1, in one embodiment, the tube carriers 162 in FCMEA 10 intersect each other to form a network having a plurality of holes. Referring to FIG. 2, in one embodiment, the tube carriers 162 in the FCMEA 10 are spaced from each other and have different shapes. Referring to FIG. 3, in one embodiment, all the tube carriers 162 in the FCMEA 10 are straight shaped and substantially perpendicular to the surface of the proton exchange membrane 12, and the plurality of tube carriers 162 are uniformly distributed, parallel to each other, and spaced from each other.

A diameter of the tube carrier 162 can be in a range from about 10 nanometers (nm) to about 10 μm. In one embodiment, the diameter of the tube carriers 162 is in a range from about 50 nm to about 300 nm. The more the catalyst particles 164 in the catalyst layer 16 per unit volume, the larger the cross section of the proton conductor 166 filled in the tube carrier 162, the smaller the impedance of the proton conductor 166, and the higher the conductibility of the protons. The tube carrier 162 can be a carbon nanotube, titanium dioxide nanotube, zinc oxide nanotube, cobalt oxide nanotube, or vanadic oxide nanotube. If the tube carrier 162 is a carbon nanotube, the carbon nanotube can be a single-walled carbon nanotube, double-walled carbon nanotube, or multi-walled carbon nanotube. A wall thickness of the tube carrier 162 can be in a range from about 1 nm to about 50 nm. The wall thickness of the tube carrier 162 can influence the performance of the FCMEA 10. In one embodiment, the wall thickness of the tube carrier 162 is in a range from about 2 nm to about 15 nm. If the wall thickness is small, the tube carrier 162 has excellent electron conductibility, and the diffusion path through which the reaction gas diffuses in the tube carrier 162 is short. A thickness of the catalyst layer 16 can be in a range from about 1 μm to about 100 μm. A length of the tube carrier 162 is not limited. If the tube carrier 162 is straight line shaped and substantially perpendicular to the surface of the proton exchange membrane 12, the length of the tube carrier 16 is substantially equal to the thickness of the catalyst layer 16. A width of the gaps between the tube carriers 162 is not limited. If the plurality of tube carriers 162 are substantially parallel to each other and spaced from each other, a distance between the adjacent tube carriers 162 can be less than 50 μm. In one embodiment, the tube carrier 162 is a carbon nanotube composed of amorphous carbon, the length of the carbon nanotube is 7 μm, the diameter of the carbon nanotube is 100 nm, the wall thickness of the carbon nanotube is 3 nm, and the distance between adjacent carbon nanotubes is 100 nm.

The catalyst particles 164 can be precious metal particles having high catalytic activity. The catalyst particles 164 can be platinum (Pt), palladium (Pd), aurum (Au), ruthenium (Ru) or any combination thereof. In one embodiment, the catalyst particles 164 are Pt particles. In one embodiment, a diameter of the catalyst particles is in a range from about 1 nm to about 8 nm. The catalyst particles 164 are uniformly adsorbed or are adhered on the inner wall of the tube carrier 162. A quantity of the catalyst particles 164 in each electrode 14 can be less than or equal to 0.5 mg·cm$^{-2}$. In addition, the catalyst particles 164 can be uniformly and stably adsorbed on the inner walls of the tube carriers 162 and cannot easily move because the tube carriers 162 have a small diameter and the walls of the tube carriers 162 have adsorbility. In one embodiment, the quantity of the catalyst particles 164 is 0.1 mg·cm$^{-2}$, and the diameter of the catalyst particles 164 is about 3 nm.

The proton conductor 166 transfers the protons and fills in the tube carriers 162. A material of the proton conductor 166 can be a proton exchange resin containing sulfoacid group. The proton exchange resin can be perfluorosulfonic acid resin or sulfonate polymer having proton exchange function or excellent thermal stability. The sulfonate polymer can be sulfonated polyether sulphone resin, sulfonated polyphenylene sulfide resin, sulfonated polybenzimidazole resin, sulfonated phosphorus enrichment nitriles resin, sulfonated polyimide resin, sulfonated polystyrene-polyethylene copolymer resin, or any combination thereof. The material of the proton conductor 166 can be different from or the same as the material of the proton exchange membrane 12.

In the catalyst layer 16, the walls of the tube carriers 162 have electron conductibility, the proton conductor 166 filled in the tube carriers 162 has proton conductibility, and the catalyst particles 164 between the proton conductor 166 and the tube carriers 162 have catalytic activity. The proton exchange membrane 12 is directly connected with the proton conductor 166 in the tube carriers 162. The gaps between the tube carriers 162 can provide the reaction gas passages. The proton conductor 166 cannot obstruct the reaction gas to reach the surfaces of the catalyst particles 164 adsorbed on the inner wall of the tube carriers 162.

The gas diffusion layer 18 is disposed on one end of the catalyst layer 16 away from the proton exchange membrane 12. The gas diffusion layer 18 and the walls of the tube carriers 162 in the catalyst layer 16 are electrically contacted with each other. The FCMEA 10 can include the proton exchange membrane 12 between two gas diffusion layers 18. Each catalyst layer 16 is disposed between the gas diffusion layer 18 and the proton exchange membrane 12. The gas diffusion layer 18 can support the catalyst layer 16, collect current, transfer gas, and expel water. A material of the gas diffusion layer 18 is a porous conductive material. The gas diffusion layer 18 can be a carbon fiber paper or a carbon nanotube film comprising of a plurality of carbon nanotubes. A thickness of the gas diffusion layer 18 can be in a range from about 100 μm to about 500 μm.

In use, a fuel gas (e.g. hydrogen gas, $H_2$) and an oxidizing agent gas (e.g. oxygen gas, $O_2$ or air containing oxygen) are respectively introduced in the two electrodes 14 disposed on the surfaces of the proton exchange membrane 12 of the FCMEA 10. The hydrogen gas can reach one electrode 14 used as the anode, and the oxidizing agent gas can reach the other electrode 14 used as the cathode.

In one end of the FCMEA 10, after the hydrogen gas is introduced into the anode, the hydrogen gas is in contact with the catalyst layer 16 through the gas diffusion layer 18. In the catalyst layer 16, if the tube carriers 162 are carbon nanotubes, the plurality of carbon nanotubes cooperatively define a plurality of reaction gas passages. The hydrogen gas diffuses to the catalyst particles 164 in the inner walls of the carbon nanotubes through the reaction gas passages. Specifically, the plurality of carbon nanotubes cooperatively define a plurality of gaps, and the carbon nanotubes are composed of porous amorphous carbon. The hydrogen gas can sufficiently diffuse to the position of outer wall of the carbon nanotubes through the gaps, and then rapidly diffuse in the carbon nanotubes through holes on the wall of the carbon nanotubes. The catalyst particles 164 are uniformly adsorbed on the inner walls of the carbon nanotubes, so that the hydrogen diffused in the carbon nanotubes can sufficiently contact the catalyst particles. A reaction of the hydrogen gas can be executed under the catalysis of the catalyst particles 164. An equation of the reaction can be as follows: $H_2 \rightarrow 2H^+ + 2e$. The hydrogen ions produced by this reaction directly contact the proton conductor 166, and the proton conductor 166 directly contacts the proton exchange membrane 12. Thus, the hydrogen ions can be transferred to the proton exchange membrane 12 through the proton conductor 166, and then transferred to the cathode contacting the proton exchange membrane 12. The electrons produced can be transferred to the external circuit through the walls of the carbon nanotubes because the amorphous carbon has electron conductibility.

On the other end of the FCMEA 10, the oxygen gas is introduced into the cathode through the gas diffusion layer 18, and the electrons produced in the anode are transferred to the cathode through the external circuit. Specifically, the oxygen gas is diffused to the catalyst layer 16 through the gas diffusion layer 18. In the catalyst layer 16, the oxygen gas can rapidly diffuse through the gaps defined by the plurality of carbon nanotubes. Furthermore, the oxygen gas can rapidly diffuse in the carbon nanotubes through the holes on the walls of the carbon nanotubes composed of porous amorphous carbon. Thus, the oxygen gas can directly contact with the catalyst particles 164 adsorbed on the walls of the carbon nanotubes. The electrons can be transferred to the surfaces of the catalyst particles 164 through the porous amorphous carbon of the carbon nanotubes. The hydrogen ions produced in the anode can be transferred to the surfaces of the catalyst particles 164 through the proton conductor 166 directly contacted with the proton exchange membrane 12. Thus, the oxygen gas, the hydrogen ions, and the electrons are in contact with the catalyst particles 164. A reaction of the oxygen gas, the hydrogen ions, and the electrons can be executed under the catalysis of the catalyst particles 164. An equation of the reaction can be as follows: $\frac{1}{2}O_2 + 2H^+ + 2e \rightarrow H_2O$. The water produced by the above reaction can diffuse to the gaps between the carbon nanotubes through the walls of the carbon nanotubes, and then diffuse to the gas diffusion layer 18 and flow out the cathode.

The catalyst particles 164 are uniformly and stably adsorbed on the inner walls of the carbon nanotubes. The proton conductor 166 is filled in the carbon nanotube. Thus, the proton conductor 166 cannot obstruct the reaction gas to reach the surfaces of the catalyst particles 164, and the oxygen, the hydrogen ions, and the electrons can sufficiently contact the catalyst particles 164. The utilization rate of the catalyst particles 164 can reach about 100%.

Figure 4:
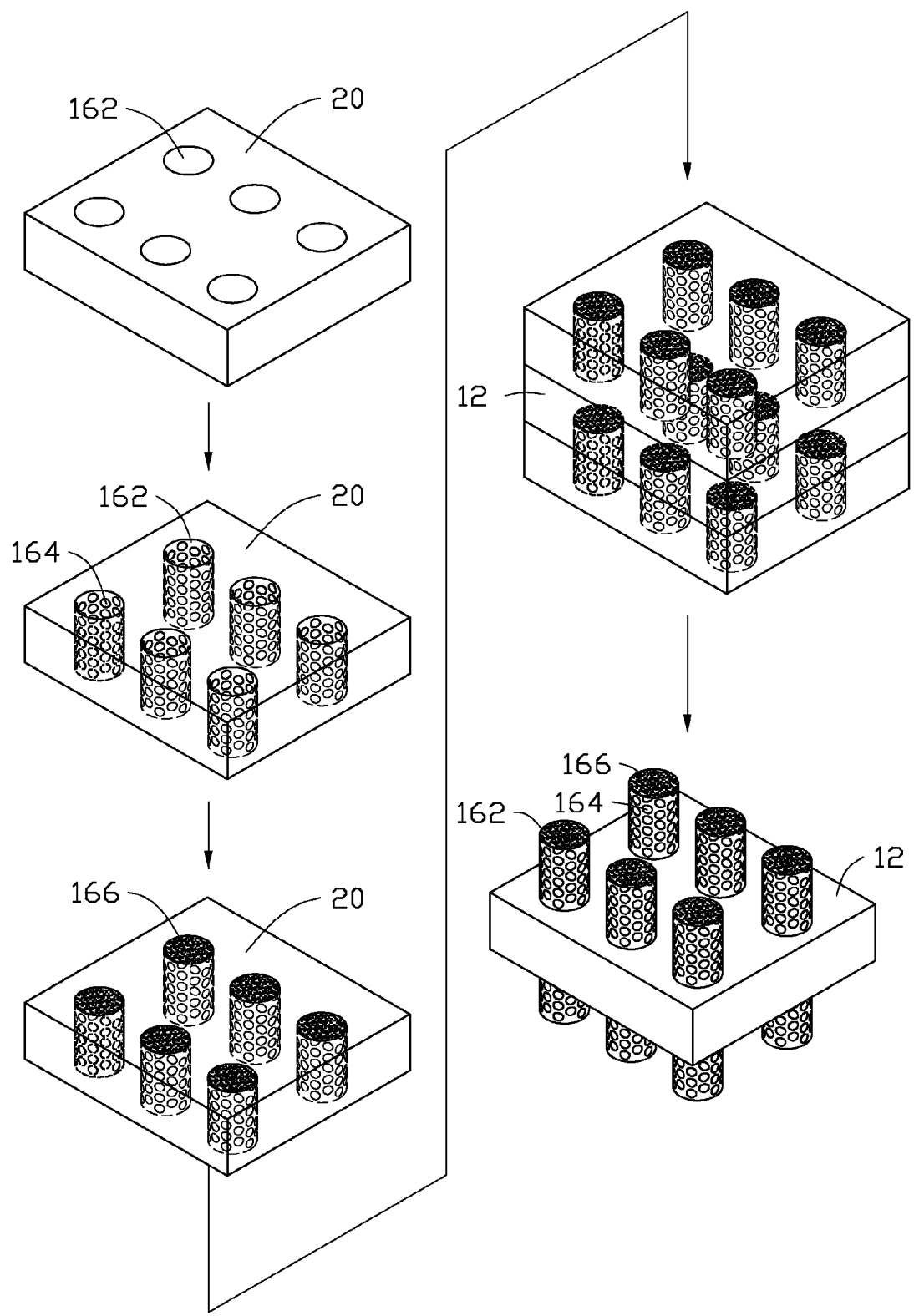
FIG. 4 is a schematic view of a process for making the fuel cell membrane electrode assembly.

Referring to FIG. 4, a method for making the FCMEA 10 includes the following steps:

S1, providing a porous template 20 having a plurality of holes and the proton exchange membrane 12;
S2, forming the tube carriers 162 having electron conductibility in the holes of the porous template 20;
S3, uniformly adsorbing a plurality of catalyst particles 164 on the inner walls of the tube carriers 162;
S4, filling proton conductor 166 in the tube carriers 162 adsorbing the catalyst particles 164;
S5, sandwiching the proton exchange membrane 12 between the two porous templates 20 to form a laminated structure, and hot pressing the laminated structure;
S6, removing the porous templates 20 from the laminated structure, thereby forming the FCMEA 10, wherein the proton conductor 166 is filled in the tube carriers 162 adsorbing the catalyst particles 164, first ends of the tube carriers 162 are connected with the proton exchange membrane 12, whereby the proton conductor 166 filled in the tube carriers 162 directly contacts with the proton exchange membrane 12.

In the step S1, a material of the porous template 20 is not limited and can form the tube carriers 162. The porous template 20 can be an alumina template or a silicon dioxide template. In one embodiment, the porous template 20 is an alumina template. The tube carriers 162 formed in the holes of the porous template 20 can define a plurality of reaction gas passages. A shape, a diameter, and the location of the holes of the porous template 20 can be set according to the shape, the diameter, and the location of the desired tube carriers 162. If the tube carriers 162 are to be uniformly distributed, substantially parallel to each other, and spaced from each other, the holes of the porous template 20 are also uniformly distributed, substantially parallel to each other, and spaced from each other. If the tube carriers 162 are to be disorderly distributed, the holes of the porous template 20 are also disorderly distributed. The porous template 20 has two opposite surfaces. A plurality of openings exist on at least one surface of the porous template 20 to expose the plurality of holes. One opening corresponds to one hole. In one embodiment, the holes of the porous template 20 extend from one surface to the other surface of the porous template 20. A diameter of the hole of the porous template 20 can be in a range from about 10 nm to about 10 μm. In one embodiment, the diameter of the hole of the porous template 20 is in a range from about 50 nm to about 300 nm. In one embodiment, the holes of the porous template 20 are uniformly distributed, substantially parallel to each other, and spaced from each other, the holes are straight line shaped, a distance between the adjacent holes is in a range from about 10 nm to about 50 μm. A thickness of the porous template 20 can be in a range from about 1 μm to about 100 μm. In one embodiment, the diameter of the holes of the porous template 20 is 100 nm, the distance between the adjacent holes is 100 nm, and the thickness of the porous template 20 is 7 μm.

In the step S2, the tube carriers 162 can be carbon nanotubes, titanium dioxide nanotubes, zinc oxide nanotubes, cobalt oxide nanotubes, or vanadic oxide nanotubes. The tube carriers 162 can be formed in the holes by vaporization method, chemical vapor deposition, sol-gel method, and immersing method.

In one embodiment, the tube carriers 162 are formed by the immersing method. The immersing method includes the following steps: S11, providing a carbon source compound solution and immersing the porous template 20 in the carbon source compound solution; S12, removing the porous template 20 from the carbon source compound solution, and annealing the porous template 20 to form the carbon nanotubes in the holes of the porous template 20.

In the step S11, the carbon source compound solution is formed by dissolving a carbon source compound in a solvent. In one embodiment, the carbon source compound is dissolved in water or volatile organic solvent. The water can be distilled water or deionized water. The volatile organic solvent can be ethanol, propyl alcohol, or acetone. The carbon source compound can be decomposed to form carbon by annealing. In one embodiment, the carbon source compound is decomposed to form amorphous carbon. The carbon source compound can be oxalic acid, sucrose, glucose, phenolic resin, polyacrylic acid, polyacrylonitrile, polyoxyethylene, or polyvinyl alcohol. If a concentration of the carbon source compound solution is too large, the carbon source compound solution cannot sufficiently immerse in the holes of the porous template 20. If the concentration of the carbon source compound solution is too small, a viscosity of the carbon source compound solution is too small and the carbon nanotubes cannot be sufficiently formed. In addition, a porosity of the tube carriers 162 can be influenced by the concentration of the carbon source compound solution. If the concentration of the carbon source compound solution is small, the porosity of the tube carriers 162 is large. If the concentration of the carbon source compound solution is large, the porosity of the tube carriers 162 is small. In one embodiment, the concentration of the carbon source compound solution is in a range from about 0.05 g/mL to about 1 g/mL. The porous template 20 can be immersed in the carbon source compound solution for about 5 minutes to about 5 hours, whereby the carbon source compound solution can sufficiently immersed in the holes of the porous template 20. In one embodiment, the alumina template is immersed in the oxalic acid solution having the concentration of 0.2 g/mL for about 1 hour. In addition, the immersing period can be decreased by applying a pressure on the carbon source compound solution.

In the step S12, the porous template 20 can be further washed by water or volatile organic solvent and dried, after the porous template 20 is taken out from the carbon source compound solution. Specifically, the washed porous template 20 can be heated under vacuum. A heating temperature can be in a range from about 60° C. to about 100° C. A heating period can be in a range from about 30 minutes to about 6 hours. In one embodiment, the washed porous template 20 is heated to about 80° C. for about 3 hours. The porous template 20 can be annealed by the following steps: disposing the porous template 20 in the heating stove under protective atmosphere; calcining the porous template 20 to a predetermined temperature, thereby decomposing the carbon source compound to form carbon nanotubes composed of amorphous carbon. The calcining period and the calcining temperature can be set according to the kinds of the carbon source compound. In one embodiment, the carbon source compound is oxalic acid, the porous template 20 is calcined to about 100° C. to about 150° C. under a heating speed of about 1° C./minutes to about 5° C./minutes. The temperature of the porous template 20 is kept at about 100° C. to about 150° C. for about 1 hour to about 3 hours. The porous template 20 is then continuously calcined to about 400° C. to about 600° C. at a rate of about 1° C./minutes to about 5° C./minutes. The temperature of the porous template 20 is kept at about 400° C. to about 600° C. for about 2 hours to about 8 hours. The porous template 20 is then cooled to room temperature.

In the step S3, the catalyst particles 164 can be precious metal particles having high catalytic activity. The material of the catalyst particles 164 can be Pt, Pd, Au, or Ru. In one embodiment, the catalyst particles 164 are Pt particles. The catalyst particles 164 can be formed by immersing the porous template 20 defining the tube carriers 162 in a solution containing catalyst ions, and reducing the catalyst ions to form the catalyst particles 164 uniformly adsorbed on the inner walls of the tube carriers 162. In one embodiment, the Pt catalyst particles are formed by the following steps: S21, providing a platinic chloride ($H_2PtCl_6$) solution, and immersing the porous template 20, having the tube carriers 162 formed therein, in the $H_2PtCl_6$ solution, wherein a PH value of $H_2PtCl_6$ solution is adjusted to alkalescence. S22, adding a reduction object into the $H_2PtCl_6$ solution to form a mixture, and heating the mixture to cause a redox reaction between the $H_2PtCl_6$ and the reduction object, thereby forming Pt catalyst particles on the tube carriers 162.

In the step S21, the $H_2PtCl_6$ solution is formed by dissolving the $H_2PtCl_6$ in distilled water or volatile organic solvent. A concentration of the $H_2PtCl_6$ solution can be set according to the quantity of the formed catalyst particles 164. A molar concentration of the $H_2PtCl_6$ solution can be in a range from about 0.01 mol/L to about 0.1 mol/L. In one embodiment, the molar concentration of the $H_2PtCl_6$ solution is 0.05 mol/L. The PH value of the $H_2PtCl_6$ solution can be adjusted by dissolving an alkaline compound in the $H_2PtCl_6$ solution. The alkaline compound can be $Na_2CO_3$, NaOH, or KOH. The PH value of the $H_2PtCl_6$ solution can be adjusted in a range from about 8 to about 9. In the step S22, the reduction object can be formaldehyde (HCHO), formic acid (HCOOH), or potassium borohydride ($KBH_4$). A quantity of the reduction object can be set to reduce the Pt ions of the $H_2PtCl_6$ solution into metal Pt particles. A heating temperature can be in a range from about 50° C. to about 70° C. Furthermore, a protective gas can be introduced during the heating process. The protective gas can be nitrogen gas or argon gas. The diameter of the formed catalyst particles 164 can be in a range from about 1 nm to about 8 nm. After step S22, the porous template 20 can be taken out, washed by the distilled water or volatile organic solvent, and then dried.

In the step S4, the proton conductor 166 can be fused into liquid, or be dissolved in a solvent to form a proton conductor solution. The proton conductor 166 can be filled in the tube carriers 162 by two methods. The first method is flatly disposing the porous template 20 on the fused proton conductor 166 or the proton conductor solution. The second method is pouring the fused proton conductor 166 or the proton conductor solution on the surface exposing the holes of the porous template 20.

In the first method, the surface exposing the holes of the porous template 20 is in contact with the fused proton conductor 166 or the proton conductor solution, and the fused proton conductor 166 or the proton conductor solution is gradually immersed into the tube carriers 162 in the holes of the porous template 20 under a capillary force. In the second method, the fused proton conductor 166 or the proton conductor solution gradually flows into the tube carriers 162 in the holes of the porous template 20. A vacuum pump can be used to pump the fused proton conductor 166 or the proton conductor solution, by which the fused proton conductor 166 or the proton conductor solution can rapidly flow in the tube carriers 162 in the holes of the porous template 20.

If the tube carriers 162 in the holes of the porous template 20 are filled with the fused proton conductor 166, the fused proton conductor 166 can be solidified by standing in room temperature or low temperature heating for a predetermined period. If the tube carriers 162 in the holes of the porous template 20 are filled with the proton conductor solution, the solvent in the proton conductor solution can be filtrated out, and the remaining proton conductor 166 can then be solidified by standing in room temperature or low temperature heating for a predetermined period. In addition, the porous template 20 filled with the proton conductor 166 can be washed by the distilled water or volatile organic solvent, and then vacuum dried. In one embodiment, the proton conductor 166 is perfluorosulfonic acid resin. Before filling the perfluorosulfonic acid resin in the tube carriers 162 in the holes of the porous template 20, the perfluorosulfonic acid resin is heated to a molten state.

In the step S5, after hot pressing the laminated structure, the laminated structure is integrated together and cannot be separated. The proton conductor 166 in the tube carriers 162 is directly connected with the proton exchange membrane 12.

In the step S6, the porous templates 20 can be removed by corrosion technology. In one embodiment, the porous template 20 is an alumina template, the laminated structure is immersed in a NaOH water solution or a $H_3PO_4$ water solution to erode the alumina template. In one embodiment, a molar concentration of the NaOH water solution is in a range from about 0.5 mol/L to about 4 mol/L. A mass ratio of the $H_3PO_4$ water solution is in a range from about 3% to about 15%. After removing the alumina template, the orderly oriented tube carriers 162 are respectively disposed on two opposite surfaces of the proton exchange membrane 12.

Before or after the step 6, the gas diffusion layer 18 can be formed on one end of the tube carriers 162 away from the proton exchange membrane 12.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a fuel cell membrane electrode assembly, the method comprising:
   providing a porous template and a proton exchange membrane, the porous template comprising a plurality of holes;
   forming a plurality of tube carriers having electron conductibility, wherein each of the plurality of tube carriers is formed in one of the plurality of holes of the porous template;
   uniformly adsorbing a plurality of catalyst particles on an inner wall of the each of the plurality of tube carriers;
   filling proton conductor in the each of the plurality of tube carriers having the plurality of catalyst particles adsorbing thereon;
   sandwiching the proton exchange membrane between two porous templates to form a laminated structure;
   hot pressing the laminated structure; and
   removing the porous templates from the hot pressed laminated structure, thereby remaining the plurality of tube carriers filled with the proton conductor and having the plurality of catalyst particles adsorbed thereon, wherein a first end of the each of the plurality of tube carriers is connected with the proton exchange membrane, thereby contacting the proton exchange membrane with the proton conductor filled in the each of the plurality of tube carriers.

2. The method of claim 1, wherein the plurality of holes of the porous template are uniformly distributed.

3. The method of claim 1, wherein the porous template has two opposite surfaces, a plurality of openings exist on at least one surface of the porous template to expose the plurality of holes.

4. The method of claim 3, wherein the proton conductor is fused into a liquid or dissolved in a solvent to form a proton conductor solution, before filling the proton conductor in the plurality of tube carriers.

5. The method of claim 4, wherein the step of filling proton conductor in the plurality of tube carriers is realized by flatly disposing the porous template on the fused proton conductor or the proton conductor solution, with the surface exposing the plurality of holes of the porous template is in contact with the proton conductor, and the proton conductor is gradually immersing into the plurality of tube carriers under a capillary force.

6. The method of claim 3, wherein the plurality of holes extends from one surface to the other surface of the porous template.

7. The method of claim 1, wherein the plurality of tube carriers are selected from the group consisting of carbon nanotubes, titanium dioxide nanotubes, zinc oxide nanotubes, cobalt oxide nanotubes, vanadic oxide nanotubes, and any combination thereof.

8. The method of claim 7, wherein the carbon nanotubes are formed by the following steps: providing a carbon source compound solution and immersing the porous template in the carbon source compound solution; taking out the porous template from the carbon source compound solution; and annealing the immersed porous template to form the carbon nanotubes in the plurality of holes of the porous template.

9. The method of claim 8, wherein the carbon source compound solution is formed by dissolving a carbon source compound in a solvent, the carbon source compound is capable of being decomposed into carbon, and the solvent is water or volatile organic solvent.

10. The method of claim 9, wherein a concentration of the carbon source compound solution is in a range from about 0.05g/mL to about 1g/mL.

11. The method of claim 9, wherein the porous template is immersed in the carbon source compound solution for about 5 minutes to about 5 hours.

12. The method of claim 8, wherein the annealing the immersed porous template is realized by calcining the immersed porous template to a predetermined temperature under a protective atmosphere, thereby decomposing the carbon source compound to form carbon nanotubes composed of amorphous carbon.

13. The method of claim 1, wherein the uniformly adsorbing the plurality of catalyst particles on the inner wall of the each of the plurality of tube carriers is processed by the following steps: immersing the porous template having the tube carriers formed therein in a solution containing catalyst ions; and reducing the catalyst ions to form the plurality of catalyst particles uniformly adsorbed on the inner wall of the each of the plurality of tube carriers.

14. The method of claim 1, wherein the uniformly adsorbing the plurality of catalyst particles on the inner wall of the each of the plurality of tube carriers is processed by the following steps: providing a $H_2PtCl_6$ solution, immersing the porous template having the tube carriers formed therein in the $H_2PtCl_6$ solution, and adjusting a pH value of $H_2PtCl_6$ solution to alkalescence; and adding a reduction object into the $H_2PtCl_6$ solution to form a mixture, and heating the mixture to cause a redox reaction between the $H_2PtCl_6$ and the reduction object, thereby forming Pt catalyst particles on the plurality of tube carriers.

15. The method of claim 14, wherein the $H_2PtCl_6$ solution is formed by dissolving $H_2PtCl_6$ in distilled water or volatile organic solvent.

16. The method of claim 14, wherein the PH value of the H$_2$PtCl$_6$ solution is adjusted in a range from about 8 to about 9.

17. The method of claim 14, wherein the reduction object is HCHO, HCOOH, or KBH$_4$.

18. The method of claim 1, wherein the porous template is an alumina template.

19. The method of claim 18, wherein the removing the porous templates from the hot pressed laminated structure is immersing the laminated structure in a NaOH water solution or a H$_3$PO$_4$ water solution to erode the porous templates.

20. A method for making a fuel cell membrane electrode assembly, the method comprising:

providing a porous template and a proton exchange membrane, the porous template comprising a plurality of holes;

forming a plurality of tube carriers having electron conductibility, wherein each of the plurality of tube carriers is formed in one of the plurality of holes of the porous template;

uniformly adsorbing a plurality of catalyst particles on an inner wall of the each of the plurality of tube carriers in the porous template;

filling proton conductor in the each of the plurality of tube carriers having the plurality of catalyst particles adsorbing thereon in the porous template;

sandwiching the proton exchange membrane between two porous templates to form a laminated structure;

hot pressing the laminated structure; and removing the porous templates from the hot pressed laminated structure, thereby remaining the plurality of tube carriers filled with the proton conductor and having the plurality of catalyst particles adsorbed thereon, wherein a first end of the each of the plurality of tube carriers is connected with the proton exchange membrane, thereby contacting the proton exchange membrane with the proton conductor filled in the each of the plurality of tube carriers, the plurality of tube carriers are selected from the group consisting of titanium dioxide nanotubes, zinc oxide nanotubes, cobalt oxide nanotubes, vanadic oxide nanotubes, and any combination thereof.

* * * * *